United States Patent [19]
Wilson

[11] Patent Number: 4,573,399
[45] Date of Patent: Mar. 4, 1986

[54] PISTON AND CYLINDER ASSEMBLY, A POWER ASSISTED STEERING GEAR WHICH INCLUDES SUCH AN ASSEMBLY AND A METHOD OF FORMING A PISTON FOR SUCH AN ASSEMBLY

[75] Inventor: Alan G. Wilson, Bristol, United Kingdom

[73] Assignee: Cam Gears Limited, Hertfordshire, United Kingdom

[21] Appl. No.: 732,895

[22] Filed: May 9, 1985

Related U.S. Application Data

[63] Continuation of Ser. No. 504,470, Jun. 15, 1983, abandoned.

[30] Foreign Application Priority Data

Jul. 21, 1982 [GB] United Kingdom ................ 8221106

[51] Int. Cl.$^4$ .............................................. F01B 31/00
[52] U.S. Cl. ........................................ 92/110; 92/136; 92/172
[58] Field of Search .................. 92/172, 136, 109, 110

[56] References Cited

U.S. PATENT DOCUMENTS

| | | | |
|---|---|---|---|
| 2,820,433 | 1/1958 | Pyk | 92/172 |
| 3,150,570 | 9/1964 | Johnson et al. | 92/172 |
| 3,951,045 | 4/1976 | Frei et al. | 92/109 X |
| 4,191,095 | 3/1980 | Heyl | 92/172 X |
| 4,246,833 | 1/1981 | Burklund | 92/172 X |
| 4,351,228 | 9/1982 | Schultz et al. | 92/136 X |

Primary Examiner—Edward K. Look
Attorney, Agent, or Firm—Yount & Tarolli

[57] ABSTRACT

A piston and cylinder assembly, a power assisted steering gear which includes such an assembly and a method of forming a piston for such an assembly. A rack and pinion type power assisted steering gear has a rack member 2 coupled to a piston member 6 slidable within a cylinder 16 and forming therewith a double acting servo motor fluid pressure supply and exhaust from chambers 21 and 22 of which is controlled to provide power assistance to displacement of the rack member 2. The piston member 6 has a piston part 10 integrally formed with rod parts 11 and 12 which extend axially from opposite sides of the piston part. The differential in diameter between the rod parts 11 and 12 and the piston part is provided by radial displacement of a tubular workpiece, preferably by subjecting axial part lengths of the workpiece to a rolling or swaging operation whereby the diameter of the workpiece is progressively reduced to form the rod parts 11 and 12 and so that the latter merge through external transition surfaces 25 of progressively increasing diameter with the piston part 10.

10 Claims, 7 Drawing Figures

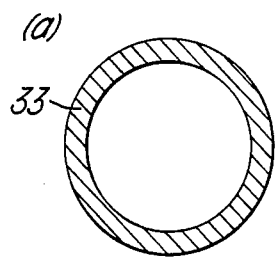
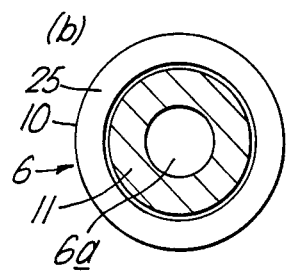
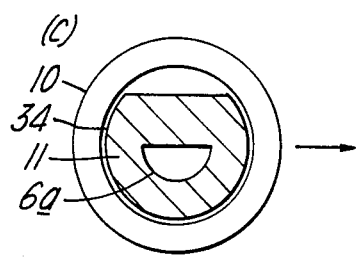
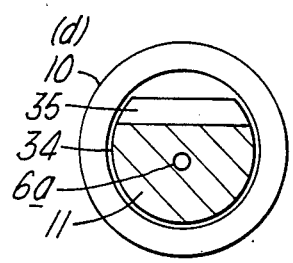
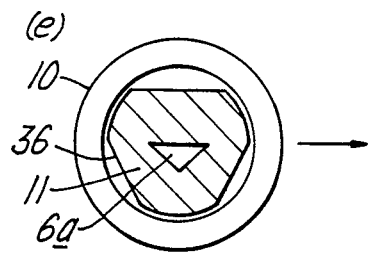
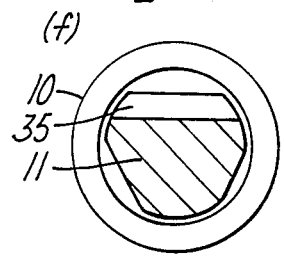

_PISTON AND CYLINDER ASSEMBLY, A POWER ASSISTED STEERING GEAR WHICH INCLUDES SUCH AN ASSEMBLY AND A METHOD OF FORMING A PISTON FOR SUCH AN ASSEMBLY_

This is a continuation of application Ser. No. 504,470 filed on June 15, 1983 now abandoned.

TECHNICAL FIELD AND BACKGROUND ART

This invention concerns an assembly comprising a piston member which is axially slidable in a cylinder, a power assisted steering gear which includes such an assembly and a method of forming a piston member for use in such an assembly. More particularly the invention concerns a piston and cylinder assembly in which the piston member has a cylindrical piston part which is slidable axially and in sealed manner within the cylinder and has rod parts which project from axially opposite sides of the piston part, usually to extend in sliding and sealed manner from the opposed ends of the cylinder to provide convenient outputs from the assembly. Conventionally a piston member of the type aforementioned requires accurate machining in the manufacture of the rod parts and piston part and/or in the fitment of the rod parts to the piston part. Piston and cylinder devices find many uses in industry, especially where they may provide a single or double acting servo motor fluid pressure supply to which is controlled to assist in displacement of a component to which the assembly is coupled. This is particularly so in the automotive industry where a double acting piston and cylinder assembly is often utilised as a servo motor in a power assisted steering gear. In the automotive industry there is an ever increasing requirement for efficient, reliable and safe components and units which lend themselves to economic techniques of manufacture. It is believed that there is a need for a piston and cylinder assembly which is capable of satisfying these requirements and which has a piston member capable of being manufactured in a manner which alleviates expensive machining operations and to such accuracy and reliability that the piston and cylinder assembly may safely be incorporated in a power assisted steering gear. It is an object of the present invention to satisfy the aforementioned requirements.

STATEMENT OF INVENTION AND ADVANTAGES

According to the present invention there is provided an assembly comprising a piston member axially slidable in a cylinder, said piston member having a cylindrical piston part slidable axially and in sealed manner within the cylinder and rod parts projecting from axially opposite sides of the piston part and wherein said rod parts are intergral with, and of relatively reduced diameter compared to, the piston part and the differential in diameter between said rod parts and the piston part is provided by radial displacement of an axially extending workpiece from which the piston member is formed.

Further according to the present invention there is provided a method of forming a piston member for use in an assembly as specified in the immediately preceding paragraph which comprises radially displacing an axially extending workpiece to provide a piston part and rod parts which project axially from axially opposite sides of the piston part, said rod parts being integral with the piston part and of relatively reduced diameter with respect to said piston part.

The invention also provides for a power assisted steering gear which includes an assembly as specified in the penultimate preceding paragraph in which the assembly provides a double acting piston and cylinder servo motor fluid pressure supply to which is controlled to assist in displacement of an output from the gear.

The present invention envisages therefore that a piston member is formed from an axially extending workpiece (which is likely, but not essentially, to have a cylindrical external surface) by radially displacing one or more part axial lengths of that member to such an extent to differentiate between and form the piston part and rod parts as an integral component and preferably without machining in the sense of removing metal from the workpiece during the formation of the piston and rod parts. It is envisaged however that in some circumstances a small amount of machining may be desirable to provide a final surface finish to the piston and rod parts prior or subsequent to the radial displacement of the workpiece to differentiate between the respective parts. Often the piston part will carry an annular seal or other sealing means by which that part forms an axially sliding seal with the cylinder and some machining of the piston part may be required to provide an appropriate seating for the sealing means.

The differential in diameter between the rod parts and the piston part may be achieved by radially enlarging a part length of the workpiece which is remote from the ends of the workpiece to form the piston part. This radial enlargement (which is not necessarily large in proportion to the original diameter of the workpiece) may be achieved by any convenient means of upsettng or gathering up the workpiece locally, for example by subjecting the workpiece to an axial compression which is sufficient to displace part of its length radially outwardly to the required extent. Alternatively where the workpiece is of tubular form, radial displacement of part of its length to form the piston part may be achieved by applying pressure within the tube to displace the tube wall radially outwardly to an appropriate extent; pressure within the tube may be achieved by use of, for example, a mechanical fluid pressure operated expanding/collapsible mandrel. More preferably however the rod parts are formed by a reduction in the diameter of part lengths of the workpiece relative to a part length of the workpiece within which the piston part is located. By this latter technique the workpiece when cylindrical may have a diameter which corresponds to that required for the piston part so that the rod parts are formed by displacing radially inwardly (and relative to a part length of the workpiece within the piston part is located) axially extending part lengths of the workpiece. This radially inward displacement to form the rod parts is preferably effected by swaging or rolling techniques which may be applied to a solid or tubular workpiece.

To alleviate unnecessary stress in the piston member it is preferred that during the formation of the piston part and rod parts, the workpiece is displaced so that the respective rod parts merge with the piston part through external transition surfaces the diameter of which increase progressively axially from the respective rod parts to the piston part.

The workpiece from which the piston member is formed is preferably tubular. It is believed that a tubular workpiece will more readily lend itself to the necessary radial displacement to differentiate between the piston part and rod parts than will a solid workpiece. The use of a tubular workpiece also provides the advantage whereby the piston member may have a passage extending axially within the piston and rod parts which passage is provided from what was the bore of the tubular workpiece from which the piston member is formed. The provision of such a passage may be convenient, particularly when the assembly is incorporated as part of a power assisted steering gear, to provide a conduit through the assembly for the passage fluid of fluid such as air or liquid between chambers which are axially spaced by the piston and cylinder assembly.

Bearing in mind the preferred use of the piston and cylinder assembly as a servo motor for a power assisted steering gear, one form of such a gear may be of a form well known in the art as rack and pinion. Accordingly one of the rod parts for the piston member may carry an axially extending array of rack teeth for engagement with a pinion member by the rotation of which pinion member the rack teeth and piston member are intended to be displaced axially relative to the cylinder. Such rack teeth can be formed on a rack component which is secured to the appropriate rod part. The securing of the rack component will usually be achieved by welding, swaging or rolling together the rack component and rod part in axially extending relationship. Where the rod parts are provided with a bore (for example by the piston member being formed from a tubular workpiece), the rack component may be partly received axially within the bore of a rod part and secured thereto, preferably by the wall of the appropriate rod part being displaced radially inwardly to secure the rack component. Alternatively the rack teeth may be formed integral with the appropriate rod part. The integral formation of the rack teeth is preferably by machining or coining, forging or otherwise moulding the teeth into the surface of the rod part. Where the rod parts are formed by a reduction in the diameter of part lengths of a tubular workpiece it will be usual for each tubular rod part to have a wall thickness greater than that of the tubular piston part and greater than that of the original tubular workpiece and this increase in thickness can be used to advantage in the formation of the rack teeth in the surface of that rod part.

DRAWINGS

Embodiments of the present invention will now be described, by way of example only, with reference to the accompanying illustrative drawings in which:

FIG. 1 shows a general arrangement of a power assisted steering gear, in part section, and which includes a piston member and cylinder assembly constructed in accordance with the present invention to provide a servo motor in the gear;

FIGS. 2 to 5 sequentially illustrate one method of forming an array of rack teeth on a piston member for an assembly in accordance with the present invention, and FIGS. 6 and 7 illustrate a modification of the method of formation which is applied for FIGS. 2 to 5.

DETAILED DESCRIPTION OF DRAWINGS

Figure 1:
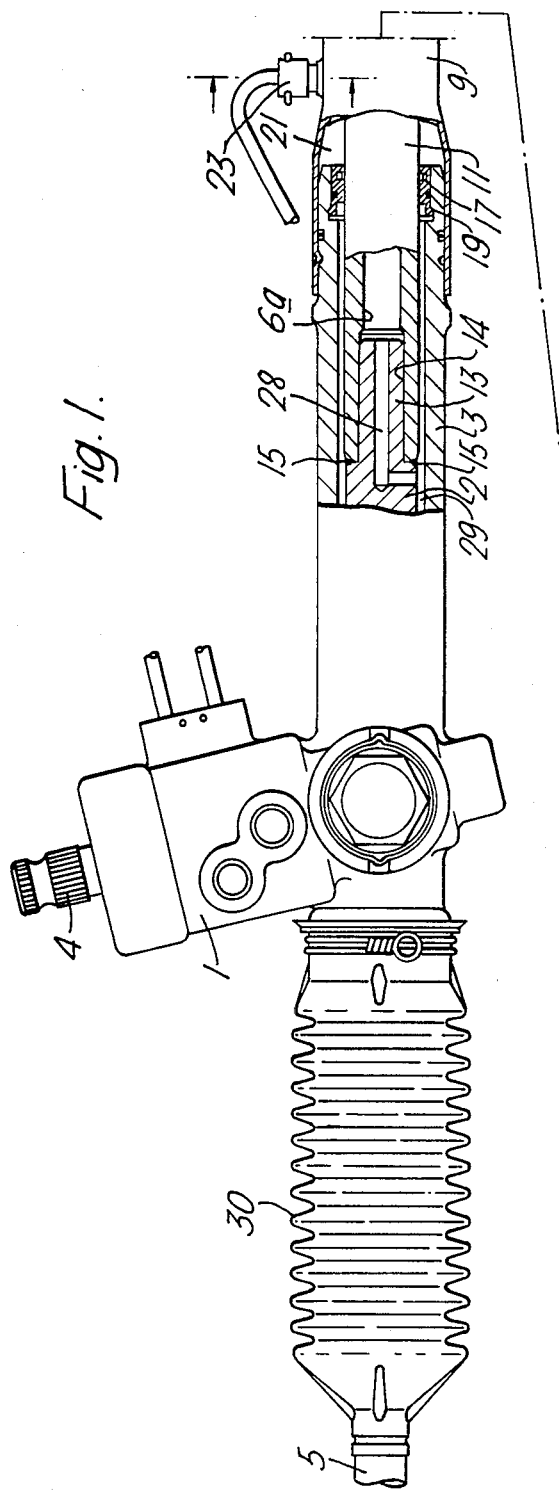
Figure 1:
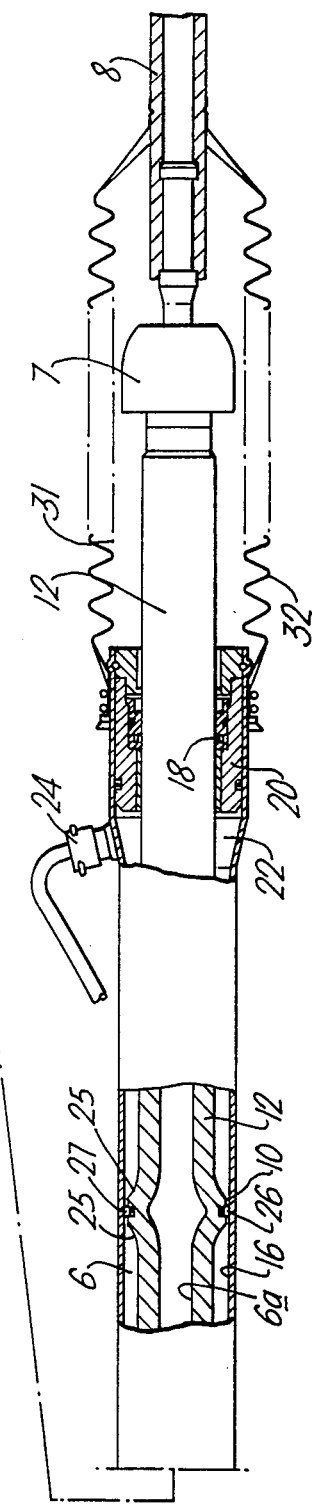

The steering gear shown in FIG. 1 is of the type generally known as rack and pinion and has a pinion housing 1 within which is rotatably mounted a pinion (not shown) the teeth of which engage with an axially extending array of teeth (not shown) on a rack member 2 which is axially displaceable through a tubular part 3 of the pinion housing. The pinion is rotatable in response to a steering manoeuvre by rotation of an input shaft 4. The shaft 4 is coupled to the pinion through valve means (not shown) within the pinion housing. The valve means is responsive to restricted relative rotation which is permitted between the input shaft 4 and the pinion member to control of the flow of fluid under pressure to a servo motor which assists in axial displacement of the rack member 2 in the same direction as that in which the rack member is displaced by its drive from rotation of the pinion. The arrangement and operation of the pinion member, valve means and rack teeth within the pinion housing 1 may be regarded as a conventional type which is well known in the steering gear art and as such need not be discussed further.

The rack member 2 is intended to provide a steering output and is coupled at one end through a universal joint (not shown) to a tie rod 5 and at its other end through an axially extending piston member 6 and a universal joint 7 to a tie rod 8. The tie rods 5 and 8 are intended to be coupled to form part of the steering linkage in conventional manner.

The piston member 6 extends rigidly from the rack member 2 with which it is axially displaceable through a tubular extension 9 carried by the tubular housing part 3.

The piston member 6 is tubular to provide a passage 6a which extends axially therethrough and has a cylindrical piston part 10 from axially opposite sides of which are axially extending cylindrical rod parts 11 and 12 which are concentric and integral with the piston part 10. The piston member 6 is coupled to the rack member 2 by a spigoted end 13 of the rack member being received within a complementary socket 14 of the piston member (which socket 14 is formed by an enlarged bore part of the passage 6a which opens into the end of the rod part 11). The rod part 11 and rack member 2 are secured together by welding at 15.

The piston part 10 is axially slidable within a cylinder 16 formed within the tubular extension 9 between axially spaced annular seals 17 and 18 through which the rod parts 11 and 12 are respectively slidable axially. The seal 17 forms part of an annular bearing unit 19 for the piston member (which unit is secured in the tubular housing part 3) and the seal 18 forms part of an annular bearing unit 20 for the piston member (which unit 20 is secured in the tubular extension 9). Formed by the piston part within the cylinder 6 and between the seals 17 and 18 are piston chambers 21 and 22 having inlet/outlet ports 23 and 24 respectively. Fluid under pressure is intended to be supplied to and exhausted from the chambers 21 and 22 by way of the ports 23 and 24 under control of the valve means within the pinion housing 1 so that the piston part and cylinder constitute a double acting device and provides the servo motor for assisting in displacement of the rack member 2 in conventional manner.

The piston part 10 is made integral with the rod parts 11 and 12 by the formation of the piston member from a cylindrical metal tube (which tube may be of the same or a different metal from that of the rack member 2). The cylindrical tubular workpiece has an external diameter corresponding to that desired for the piston part 10. Axially extending end part lengths of the workpiece which are substantially to correspond to the rod parts 11 and 12 are displaced radially inwardly relative to the part length of the workpiece within which the piston part is located. This radial displacement to form the rod parts 11 and 12 is effected by subjecting the workpiece to a swaging operation, preferably one in which the part lengths of the workpiece corresponding to the rod parts are located in the die of a swaging machine and subjected to radial-action roller percussion by which the external diameter of the workpiece is appropriately reduced. During this swaging operation the wall thickness of the rod parts 11 and 12 is increased as compared to the wall thickness of the original tubular workpiece. Furthermore, it is preferred that during the swaging operation external transition surfaces 25 are formed through which the respective rod parts 11 and 12 merge with the piston part 10 and the diameter of which surfaces 25 increase progressively axially from the respective rod parts to the piston part. By forming the piston member 6 with the swaging operation aforementioned machining of the workpiece requiring removal of metal therefrom is alleviated. However, if required an annular seating 26 can be machined in the piston part 10 for the location of an annular sealing ring 27 to slidably engage the cylinder 16. The passage 6a within the piston member 6 conveniently corresponds to what was the bore of the tubular workpiece from which the piston member is formed and this passage can, conveniently, provide a socket for reception of the spigoted end 13 of the rack member 2 or may be enlarged by machining to form the socket 14 as illustrated.

The passage 6a communicates with a passage 28 which extends through the spigoted end 13 of the rack member and communicates with a rack chamber 29 within which the rack member is displaceable. The chamber 29 is closed at one end by the bearing unit 19 and at its other end by a flexible bellows 30 coupled between the pinion housing 1 and the tie rod 5. The end of the passage 6a remote from the rack member 29 opens through a port (not shown) into a bellows chamber 31 formed within a flexible bellows 32 coupled between the tie rod 8 and the adjacent end of the tubular extension 9. The passage 6a consequently communicates between the axially spaced chambers 29 and 31 and provides a convenient conduit for the flow of fluid such as air between those chambers during their respective expansion and contraction as the bellows 30 and 31 flex in response to displacement of the rack member and piston member.

In a modification (not shown) for the gear in FIG. 1, the piston member 6 is coupled to the rack member 2 by part axial length of the rack member 2 being received within the bore of the tubular rod part 11 and the wall of the latter being displaced radially inwardly by swaging to secure the two members together. For this coupling the end of the rack member 2 which is received within the piston rod part 11 may first be rolled or swaged to present an external annular recess or equivalent non-cylindrical profile onto which the wall of the rod part can be swaged to form an interference fit therewith.

In the embodiment above described the rack member is secured to the rod part 11. In a further embodiment however the array of rack teeth are formed integral with the rod part 11 by a method which will now be described with reference to FIGS. 2 to 7. The piston member 6 with integral rack teeth is to be formed from a cylindrical tubular workpiece 33 (FIG. 2) which is subjected to the swaging operation as previously discussed to form the piston part 10 which merges through the transition surfaces 25 with the rod parts 11 and 12 (FIG. 3). In this embodiment the rod part 11 is formed considerably longer than that shown in FIG. 1, in effect to include the additional length represented by the rack member 2. The end part length of the rod part 11 on which the rack teeth are to be located is then formed into a D-section 34, conveniently by a press operation during which the shape of the passage 6a may be deformed similarly into D-section (FIG. 4). The array of rack teeth 35 are now formed on the flat of the D-section 34 conveniently by coining, forging or otherwise moulding the teeth into the surface of the rod part 11 and during which moulding the bore of the passage 6a may be further reduced (FIG. 5). If required however the rack teeth 35 may be formed by a machining operation such as broaching on the rod part 11 where the increase in wall thickness of that rod part may be quite adequate to support such machining.

In the modification shown in FIGS. 6 and 7 the part length of the rod part 11 on which the rack teeth are to be formed is made into a V-section 36 to provide convenient guide faces which can be supported to restrain the rack member from rolling within the pinion housing and its extension. During the formation of the V-section by a press operation the bore 6a may be deformed into a triangular section as shown in FIG. 6. The rack teeth 35 are now formed in a flat of the V-sectioned rod part 11 by use of the techniques aforementioned; preferably such formation is by coining or otherwise moulding and during which it is possible for the passage 6a to be completely closed (FIG. 7).

From the aforegoing it will be realised that when the piston member is formed from a tubular workpiece by swaging the wall of that workpiece radially inwardly to form the rod parts 11 and 12, the bore of the workpiece over the length thereof within the rod parts will be progressively reduced in diameter and possibly become non-cylindrical. This reduction in diameter can be to the extent shown in FIG. 5 or to remove the passage as shown in FIG. 7. In these latter circumstances it will be apparent that an appropriately sized port can be provided in the wall of the rod part 11 to communicate with part of the passage 6a which is sufficient to carry the required volume of fluid flow between chambers which are axially spaced by the piston and cylinder assembly.

I claim:
1. A power-assisted steering gear assembly for steering dirigible wheels comprising:
a pinion rotatable in response to a steering input;
rack means engaging said pinion and axially displaceable in response to rotation thereof;
a servomotor for assisting in displacement of said rack means, said servomotor including a cylinder and a piston member axially slidable in said cylinder;
means defining two fluid chambers located at opposite ends of said cylinder, said fluid chambers expanding and contracting upon axial displacement of said rack means;
said piston member comprising passage means therethrough for conducting fluid between said fluid chambers; and
said piston member comprising a one-piece homogeneous tubular structure, said one-piece homogeneous tubular structure including
a piston portion,
two rod portions projecting from axially opposed sides of said piston portion, said piston portion having an outside diameter greater than the outside diameter of said rod portions, the wall thickness of said piston portion being less than the wall thickness of said rod portions, transitional surfaces extending between said piston portion and said rod portions, the diameter of said transitional surfaces progressively decreasing from said outside diameter of said piston portion to said outside diameter of said rod portions, and surface means extending internally of said piston portion and said rod portions defining said passage means through said piston member.

2. An assembly as set forth in claim 1 comprising means for providing a fluid seal between said piston portion and said cylinder.

3. An assembly as set forth in claim 2 wherein said means for providing a fluid seal comprises a sealing ring located in an annular groove in the outer surface of said piston portion.

4. An assembly as set forth in claim 1 wherein said rack comprises an array of axially spaced rack teeth extending transverse to one of said rod portions and formed in said one rod portion.

5. An assembly as set forth in claim 1 wherein said rack means comprises a rack component secured to one end of one of said rod portions and extends threrefrom.

6. An assembly as set forth in claim 5 wherein said rack component has a portion received axially within a bore of said one rod portion, and the wall of said one rod portion is displaced radially inwardly to secure said rack component thereto.

7. An assembly as set forth in claim 6 wherein the bore in which said rack component is received is formed by an end of said passage means through said piston member.

8. A power assisted steering gear assembly for use in steering wheels of a vehicle, said steering gear assembly comprising:

a valve actuatable in response to a steering input,
a pinion rotatable in response to the steering input,
a rack disposed in meshing engagement with said pinion,
a cylinder, and
a tubular one-piece piston member connected with one end of said rack and cooperating with said cylinder to at least partially define a pair of variable volume chambers connected in fluid communication with said valve, said tubular one-piece piston member including a hollow piston portion, a hollow first rod portion projecting in a first axial direction from said piston portion and connected with one end of said rack, and a hollow second rod portion projecting in a second axial direction from said piston portion, said tubular one-piece piston member having a continuous wall extending between opposite ends of said piston member, said wall of said one-piece piston member having a first thickness in said piston portion of said one-piece piston member and having a second thickness in said first and second rod portions of said piston member, said second wall thickness being greater than said first wall thickness.

9. An assembly as set forth in claim 8 wherein said rack is formed as one-piece with said piston member.

10. A power assisted steering gear assembly for steering wheels of a vehicle, said steering gear assembly comprising:

a valve actuatable in response to a steering input,
a pinion rotatable in response to the steering input,
a cylinder, and
a one-piece tubular member,
said one-piece tubular member including a piston portion, a first rod portion projecting in a first axial direction from said piston portion, a second rod portion projecting in a second axial direction from said piston portion, and a rack portion projecting in the second axial direction from one end of said second rod portion, said rack portion of said one-piece tubular member being disposed in meshing engagement with said pinion, said piston portion of said one-piece tubular member cooperating with said cylinder to at least partially define a pair of variable volume chambers connected in fluid communication with said valve, said one-piece tubular member having a continuous wall extending between opposite ends of said one-piece tubular member, said wall of said one-piece tubular member having a first thickness in said piston portion of said one-piece tubular member, a second thickness in said first and second rod portions of said one-piece tubular member and a third thickness in said rack portions of said one-piece tubular member, said second wall thickness being greater than said first wall thickness and less than said third wall thickness.

* * * * *